Patented Apr. 19, 1938

2,114,331

UNITED STATES PATENT OFFICE 2,114,331

PROCESS FOR THE ACCELERATED MATURING OF DISTILLED SPIRITS

Kenneth R. Brown, Tamaqua, Pa., assignor to Atlas Powder Company, Wilmington, Del., a corporation of Delaware No Drawing. Application January 10, 1934, Serial No. 706,146

1 Claim. (Cl. 99—48)

My invention relates to a process for the accelerated maturing of distilled spirits, such as brandy, whiskey and similar products having a high ethyl alcohol content.

The object of this invention is to mature distilled spirits in a comparatively short time.

The present best known method of maturing distilled liquors consists of a long period of storage in wooden barrels, generally charred oak barrels. Usually this period of storage is not less than four years. The principal purpose of this long storage period is to render the distilled spirits more palatable. It is well known that freshly distilled spirits are not palatable and the taste thereof is described as raw and harsh. However, if these same spirits are stored in charred oak barrels for a long period of time, the harshness and rawness disappear and the spirits become palatable. One of the principal changes which takes place during this storage or maturing period is that the acids and esters reach an equilibrium and thus a smooth and pleasant taste is effected.

However, one of the disadvantages of this long maturing time is that the fusel oil (higher alcohols, such as propyl and butyl alcohol) increases during storage. This is due principally to the fact that ethyl alcohol being more volatile, evaporates to a certain extent during storage and thereby the percentage of fusel oil in the spirits is increased. As fusel oil is more toxic than ethyl alcohol, a high fusel oil content in the distilled spirits is to be avoided.

Another disadvantage in the process for maturing distilled spirits in wooden barrels is the extremely high cost. Due to the slowness of the process, large quantities of spirits must be stored in warehouses. Usually these warehouses are heated in order to accelerate the aging process somewhat, but even then the time is very seldom less than four years. Not only is there a large capital investment in warehouses, barrels, and distilled spirits, but there is also a considerable loss of product due to the evaporation of ethyl alcohol during this long storage period.

Now I have found that activated carbons are more efficient than wooden barrels, such as charred oak barrels, in the maturing of distilled spirits. An activated carbon is a material containing a preponderant amount of the element carbon, which has been treated in such a manner as to render it highly absorptive. Commercial gas adsorbing carbon and commercial decolorizing carbons, such as Darco, are examples of activated carbons. Such materials as the products of the mere thermal decomposition of organic substances are not ordinarily classed as activated carbons and should not be confused with the activated carbon employed in carrying out the purposes of the present invention. Ordinary charcoal, representing the mere thermal decomposition of wood is, to a certain extent, adsorptive, and when freshly made and before it has ever been used for taking up the impurities of other substances, it is an active adsorbent. However, even when freshly made and before having ever been used, it differs radically from "activated" carbon.

"Activated" carbon is carbon, charcoal, for example, which has been subjected to a very high degree of heat and to a degree of heat so far above the normal heat experienced in the mere thermal decomposition of wood, etc., as to bring about very radical changes in the conditions existing in the cells or pores of the carbon. This high degree of heat drives off gases and impurities which would otherwise remain in and clog the cells of the carbon and inhibit the high degree of adsorptive action which is characteristic of "activated" as contrasted with that of the charcoal or other carbons, not so treated.

Further, after having been "activated" by having its cells freed of these inhibiting substances, the charcoal may be used over and over again by subjecting it to the proper treatment to free it of the impurities which it may have absorbed from whatever material it has been used to purify. I have found that activated carbons produce this desired equilibrium between the acids and esters in the course of minutes and hours where it required months and years to produce the same effect by storing in charred oak barrels. Furthermore, I have found that activated carbons absorb a portion of the fusel oil so that the distilled spirits matured by our process have a lower fusel oil content than similar distilled spirits subjected to maturing in charred oak barrels, the result being that the physiological properties of the distilled spirits matured by the process of this invention are superior. The equilibrium or balance between the acids and esters as defined herein is the equivalent of the balance achieved through storage of the liquor in charred oak casks for not less than one year.

In carrying out my invention, I may mature the distilled spirits by agitating the spirits with activated carbon. I may carry out the treatment at room temperatures or below or at elevated temperatures, such as at the boiling point of the spirits. In this latter case, it is obvious that the treating vessel must be equipped with a reflux condenser. I may carry out the treatment employing activated carbons whose water extracts are acid, neutral or alkaline. However, I prefer in most cases to employ activated carbons whose water extracts have a pH value below 7.0, as I do not desire to have the organic acids present in the distilled spirits to be neutralized by the alkali in those activated carbons whose water extracts have a pH value above 7.0. I may also use activated carbons in a granular form or in a finely divided state. I prefer to employ activated carbons in a finely divided or powdered form so as to effect intimate contact of the activated carbons with the distilled spirits being treated.

The following example will illustrate one method of carrying out my invention:—

To a convenient volume of distilled spirits there is added one-half percent (by weight) of Darco—a very powerful activated carbon. The mixture is refluxed for one-half hour, the boiling of the mixture effecting adequate agitation. The mixture is allowed to cool. During the cooling, the carbon settles and the supernatant liquor can be drawn off. In order to effect a more complete separation of the distilled spirits and the activated carbon, filtration may be resorted to. The following analytical data show the changes which take place when carrying out my maturing process according to the foregoing example:

| Treatment | Proof | Grams per 100 liters | | |
|---|---|---|---|---|
| | | Acids as acetic | Esters as acetic | Fusel oil as amyl alcohol |
| Liquor before treatment | 94.4 | 7.4 | 26.0 | 83.7 |
| Liquor after treatment | 94.3 | 13.0 | 34.0 | 46.6 |

Crompton and Tolman, in the Journal of the American Chemical Society, vol. 30, pages 97–136, give an extensive report on the study of whiskey stored in wood. The following analyses show the changes which took place in their sample No. 2604 when stored in a charred white oak barrel:

| Age | Proof | Solids | Grams/100 liters calculated to original volume | | | | |
|---|---|---|---|---|---|---|---|
| | | | Acids as acetic | Esters as acetic | Aldehydes as acetic | Furfurol | Fusel oil as amyl alcohol |
| New | 100.0 | 16.0 | 17.2 | 18.5 | 2.2 | 1.5 | 128.0 |
| 1 yr | 102.0 | 150.0 | 47.6 | 36.2 | 3.6 | 1.7 | 132.0 |
| 2 yrs | 106.0 | 171.0 | 47.5 | 53.9 | 9.4 | 2.5 | 154.7 |
| 3 yrs | 108.0 | 185.0 | 58.9 | 66.0 | 11.0 | 2.6 | 168.5 |
| 4 yrs | 111.0 | 197.0 | 59.6 | 64.2 | 13.5 | 3.1 | 180.0 |

It is evident that by refluxing new distilled spirits with activated carbon for one-half hour, according to the example of my process given above, the ester content is increased to a value equivalent to that obtained by maturing distilled spirits in a charred oak barrel for one year.

The distilled spirits, after treatment with activated carbons, are generally water white and lack that characteristic flavor and bouquet of distilled spirits aged in wood or charred wood barrels. However, I have found that this color and bouquet may be imparted to distilled spirits matured by my process by agitating the distilled spirits with oak chips or charred oak chips subsequent to the activated carbon treatment and decantation or filtration. Generally, one percent (by weight) of oak chips or charred oak chips is sufficient for this purpose. Heating the distilled spirits and oak or charred oak chips hastens and aids the impartment of color and bouquet.

While I have described my invention and have given a specific and detailed example, I do not wish to limit myself to the exact conditions given herein. In my specific example, I have shown a definite proportion of activated carbon employed, a definite grade of activated carbon, a definite temperature for carrying out the treatment, and a definite time. I wish it to be understood that I do not limit myself to these definite conditions but include within the scope of my invention the maturing of distilled spirits by agitating said spirits with an activated carbon.

Further, while I prefer to agitate the distilled spirits with oak chips, or charred oak chips, subsequent to the activated carbon treatment, for the purpose of imparting color and bouquet, I wish it to be understood that it is within the purview of the invention to use other hard wood chips or charred chips for the imparting of additional or different flavors, if desired. For example, in the smoking of hams the smoke of hickory wood is found to impart delightful flavors, and I may employ charred hickory or other chips in lieu of the oak chips, if desired.

Having described my invention, what I claim is:

The herein described method of maturing distilled alcoholic spirits which comprises adding finely divided activated carbon to said distilled spirits and refluxing the mixture at the boiling point of said distilled spirits with agitation of the mixture caused by the boiling thereof, for a sufficient length of time to effect adsorption of a substantial proportion of the fusel oil from said distilled spirits into said activated carbon and to bring about a substantial balance between the esters and acids in said distilled spirits, said activated carbon being such that its water extract has a pH value below 7.0 whereby substantial neutralization of the organic acids in said distilled spirits is avoided.

KENNETH R. BROWN.